United States Patent [19]
Galea

[11] 3,832,634
[45] Aug. 27, 1974

[54] SPEED INDICATOR
[75] Inventor: Joseph Galea, Merrylands, N.S.W., Australia
[73] Assignee: Gordon Maxwell Austin, Grenfell, N.S.W., Australia
[22] Filed: Oct. 17, 1972
[21] Appl. No.: 298,419

[30] Foreign Application Priority Data
Oct. 18, 1971 Australia.............................. 6670/71
Apr. 12, 1972 Australia.............................. 8575/72

[52] U.S. Cl..................... 324/160, 73/506, 235/21, 324/80, 324/174, 116/116
[51] Int. Cl. ........................................... G01p 3/42
[58] Field of Search ............ 324/160, 166, 174, 80; 73/506, 518, 519, 70.2; 235/21, 18; 116/57, 116

[56] References Cited
UNITED STATES PATENTS

| | | | |
|---|---|---|---|
| 817,555 | 4/1906 | Hartman-Kempf | 73/506 |
| 1,165,082 | 12/1915 | Finnigan | 324/80 |
| 2,853,677 | 9/1958 | Daschke | 324/80 |
| 3,447,034 | 5/1969 | Smith | 324/174 |

Primary Examiner—Michael J. Lynch
Attorney, Agent, or Firm—Sandoe, Hopgood & Calimafde

[57] ABSTRACT

A speed indicator including a plurality of tuned reeds. A permanent magnet is mounted for rotation past the reeds which are so positioned that, upon oscillation of a particular reed at its resonant frequency, that reed contacts and adjacent surface to produce an audible signal.

3 Claims, 14 Drawing Figures

PATENTED AUG 27 1974

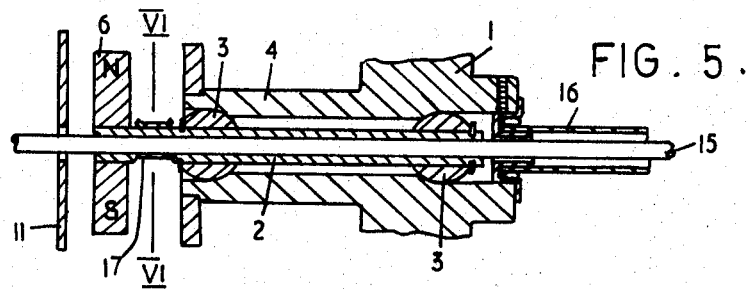
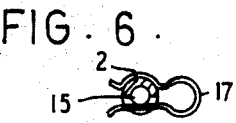
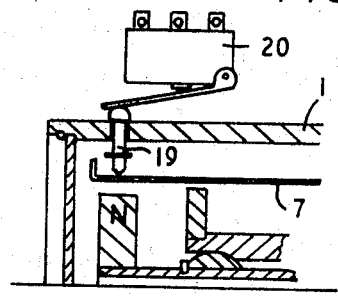
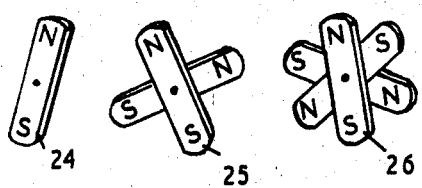
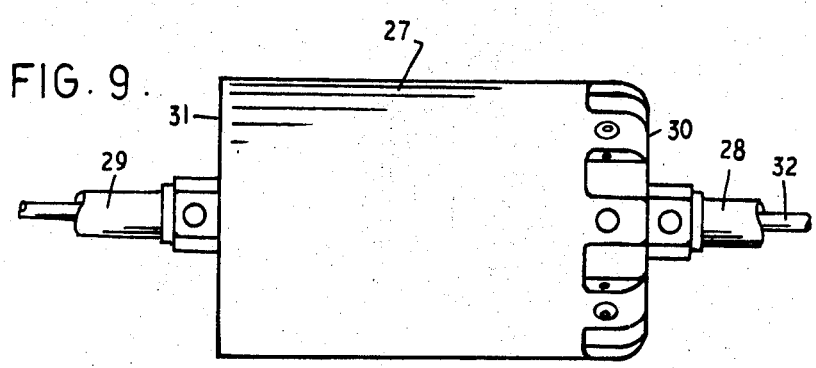

SPEED INDICATOR

The invention relates to a speed indicator and more specifically to a speed indicator using tuned reeds for indicating purposes.

Tuned reeds have been used in the past as indicator for frequency meters, in which an electromagnet is excited by current of the frequency to be measured and attracts and releases a plurality of reeds which are tuned to different frequencies. The reed, which is in resonance with the frequency to be measured will vibrate with a larger amplitude than the remaining reeds, thus giving a clear indication of the frequency of the current fed into the meter.

It has now been found that the reed principle can be employed in speed indicators to produce a speed indicator which is accurate and comparatively cheap in manufacture as it does not required any gear and friction drives used hitherto.

The speed indicator according to the invention comprises one or more magnetic members and a plurality of reeds of ferromagnetic material arranged in proximity to said members, said members and said reeds being movable relative to each other with a point on one repeatedly passing a point on the other with a frequency corresponding to the speed to be measured, and said reeds being tuned to different oscillating frequencies within a predetermined frequency range corresponding to the range of speeds to be measured, whereby the maximum oscillation amplitude of each reed corresponds to a particular frequency of repeated relative movement between the magnetic members and said reed indicative of the speed to be measured.

As the change in magnetic flux is directly proportional to the speed of the apparatus or machine, which, for example, drives a magnet or magnets, the reeds can give a direct indication of the speed to be measured. The number of magnets employed and their spacing can be chosen so that the frequency produced falls into a range which permits easy turning of the reeds, and thus no gearing is required.

The invention will be described hereinafter in more detail in connection with the drawings showing several embodiments of the invention and some modifications thereof.

FIG. 5 shows the connection of the tachometer of FIG. 1 connected to a cable drive;

FIG. 6 is a section along line VI—VI of FIG. 5;

FIG. 7 shows the operation of an electric switch by one of the reeds of the tachometer of FIG. 1 or 3;

Figure 1:
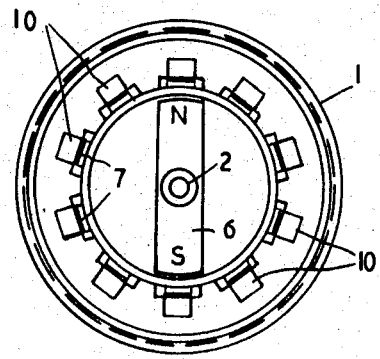
FIGS. 1 and 2 show a front view and sectional view respectively of a tachometer incorporating the invention.
Figure 10:
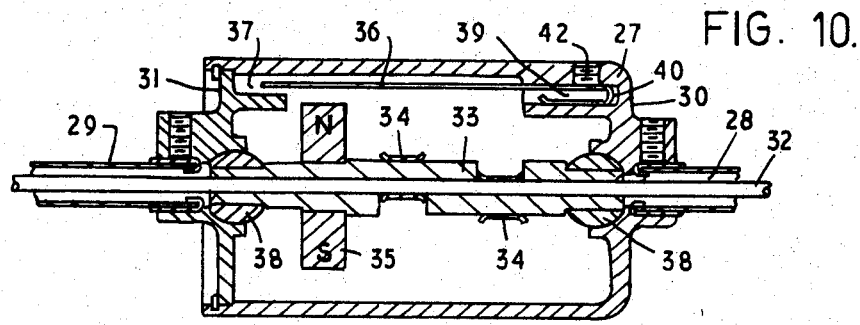
Figure 11:
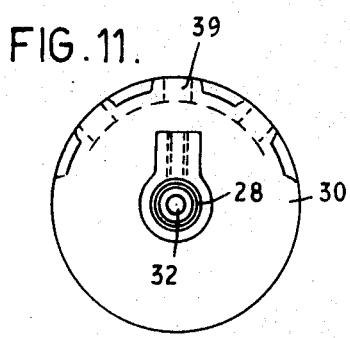
Figure 12:
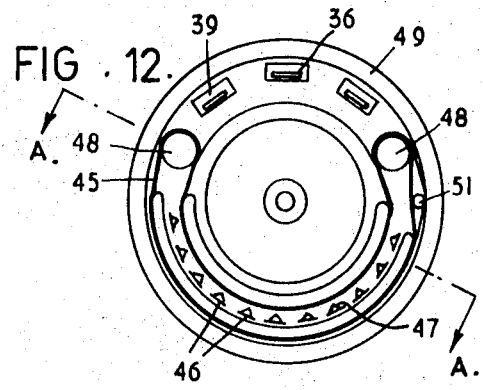
Figure 13:
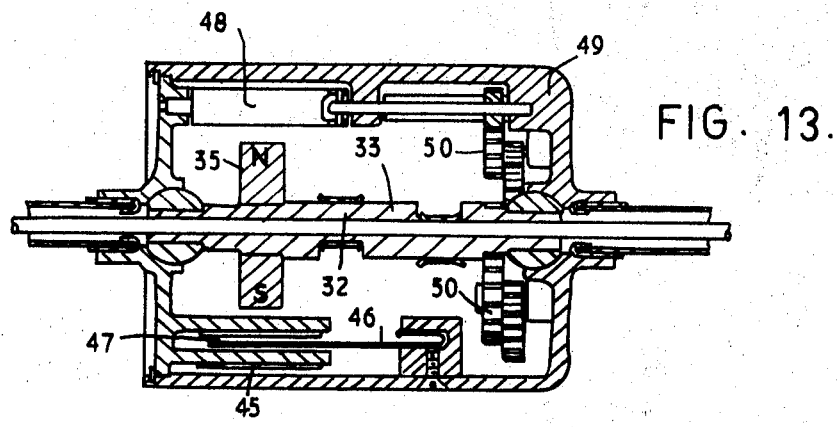

FIG. 8 indicates various forms of the magnetic body or bodies which may be used in the tachometer of FIG. 1 depending on the speed of rotation to be measured thereby;

FIG. 9 shows a top view of an acoustically operating speed warning device according to the invention;

FIG. 10 is a longitudinal section of the device shown in FIG. 9;

FIG. 11 is a front view of the speed warning device of FIG. 9;

FIG. 12 shows in cross-section a modification of the speed warning device of FIG. 9, adapted for speed recording, and FIG. 13 is a section through the device of FIG. 12 along line A—A in FIG. 12.

Figure 14:
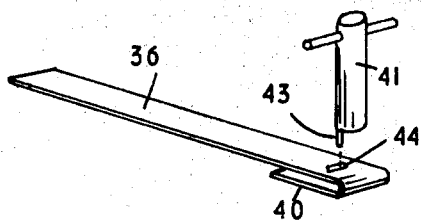

FIG. 14 shows the adjustment of the reeds for a particular resonance frequency.

Figure 2:
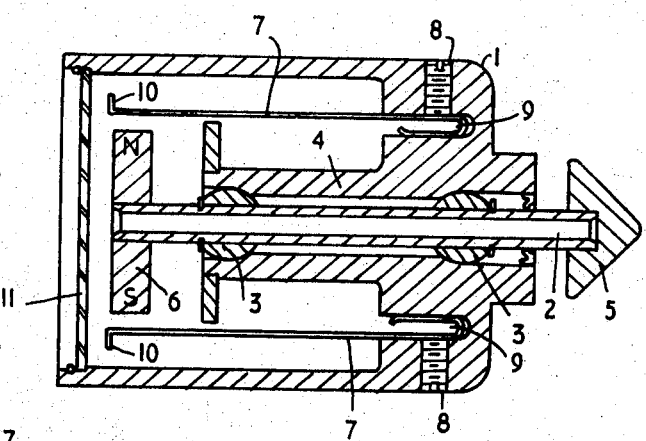

The embodiment shown in FIGS. 1 and 2 relates to a tachometer having a housing 1 of cylindrical shape which carries in one end a shaft 2 supported in bearings 3 arranged in a tubular extension 4 extending into the housing 1. The protruding end of shaft 2 is equipped with a rubber cone 5 for contact with a shaft or the like, the speed of which is to be measured.

The end of shaft 2 extending into the housing carries a two-arm permanent magnet 6 rotatable by shaft 2.

A plurality of reeds 7 of ferromagnetic material are arranged in a circle around the shaft 2 and magnet 6 with their one ends held by screws 8 in corresponding slots 9 of the housing 1 so that their free ends are positioned adjacent the circular path of the rotating magnet 6.

The reeds 7 are tuned to different frequencies corresponding to the speed range which is likely to be encountered for a particular purpose.

When the magnet 6 rotates the change in magnetic flux between the magnet and the reeds is directly proportional to the speed with which shaft 2 rotates and thus one of the reeds 7, which is tuned to a frequency corresponding to the frequency with which magnet 7 passes the reed, will oscillate with much greater amplitude than the other reeds, thus being indicative o the particular speed, with which shaft 2 rotates. To facilitate observation of the reed oscillations the ends of the reeds are bent over to form flags 10, which may be viewed through a window 11 of transparent material closing the otherwise open end of housing 1. Suitable speed marking can be placed on the window adjacent corresponding flags 10.

Figure 4:
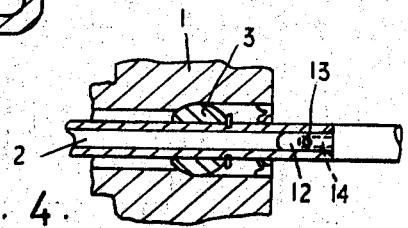
FIG. 4 shows the rotation axle of the tachometer of FIG. 1 but adapted for permanent connection to a drive shaft.

FIG. 4 shows a more direct connection between the tachometer shaft 2 and the drive, the speed of which is to be measured. In this case the drive ends in a cylindrical extension 12 which fits into the hollow shaft 2 and is held in engagement with the shaft by means of a pin 13 passing through the extension 12 and corresponding slots 14 of the shaft 2.

FIG. 5 and 6 show the adaption of the tachometer according to FIGS. 1 and 2 for use in connection with a cable drive. In this case the cable 15 passes through the hollow shaft 2 and the window 11 while the sheath 16 of the cable is fixed to the housing 1. The shaft 2 is secured to the cable 15 by means of a clip 17, which engages the cable 15 in a recess 18 of the shaft 2, as can be seen in FIG. 6.

Instead of the direct visual indication or in addition thereto the reed can operate a microswitch, when vibrating with its maximum amplitude as indicated in FIG. 7. The reed 7 in this case pushes a plunger 19 outwardly to operate a microswitch 20. The switch can be provided with a short time delay so that it remains operated during the reed oscillations as long as the latter are at their maximum. The switch in turn can actuate further optical or acoustical indicating means or perform other control functions.

Figure 3:
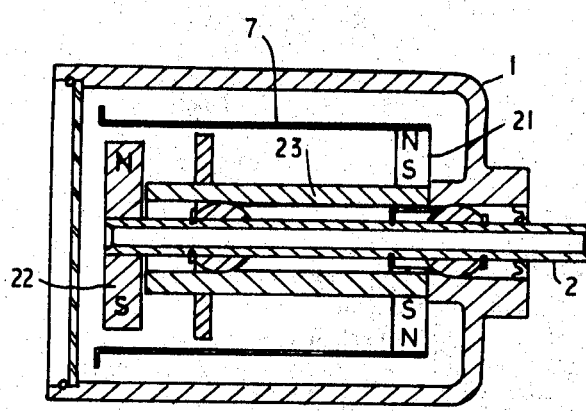
FIG. 3 shows a tachometer similar to the tachometer in FIG. 1 in which the permanent magnet is stationary.

A modification of the magnet arrangement is shown in FIG. 3. In this case the magnet is a stationary ring magnet 21 which carries the reeds at its periphery. The rotating shaft 2 carries at the end inside the housing a two- or multi-arm armature 22 of ferromagnetic material. A sleeve 23 of ferromagnetic material contacts the ring magnet 21 with one end and extends to the armature 22, but does not touch the armature, which is thus freely rotatable. The operation of this arrangement is the same as mentioned earlier as maximum vibration of a reed is achieved when the frequency of the passing armature is the same as the resonance frequency of the reed.

In order to adapt the device to a range of speeds the rotating magnet or armature can either be a simple two-arm device as shown by magnet 24 in FIG. 8 or it can be a multi-arm device as indicated in FIG. 8 by the magnet arrangements 25 or 26.

In another embodiment the invention is applied to a motor vehicle speed warning device which is simple in operation and can be installed easily in existing vehicles without major mechanical alterations thereto.

There is an increasing need for a device which will warn the driver of a motor vehicle when he reaches a certain speed without preventing him from exceeding this speed under given conditions.

Although speedometers have already been designed which give a different colour indication for various speed ranges it has been found that drivers quite unintentionally exceed certain prescribed speed limits as their attention is firstly directed to the road itself. The device in accorance with this embodiment will provide an audible signal whenever the motor vehicle exceeds a speed limit or limits as preset on the warning device.

The device can also be adapted to give a permanent record of certain speeds attained by the motor vehicle over a limited or prolonged period by recording the vibration of the selected reed on a tape or foil.

In a simple form as shown in FIGS. 9 to 11, the speed warning device is arranged in a substantially cylindrical housing 27. This housing 27 is interposed in the speedometer cable of the motor vehicle in such a way that the outer sheath of the cable is cut and the two ends 28 and 29 are fixed to the corresponding faces 30 and 31 of the cylindrical housing 27 while the inner cable 32 passes longitudinally through the housing 27 and is freely rotatable therein. A sleeve 33 is mounted on the inner cable 32 inside the housing 27 and rotatable in bearings 38 with the inner cable 32 by being clamped thereto, for example, by spring clips 34, as shown and described in connection with FIGS. 5 and 6. The sleeve 33 carries a permanent magnet 35 having its poles extending to opposite sides in a direction normal to the cable axis. While the magnet is arranged near one face 31 of the housing, the other face 30 of the housing carries a plurality of reeds 36 arranged in recesses 39 on an arc and extending within the housing 27 parallel to its cylindrical wall with their free ends passing the permanent magnet 35 and extending into an arc-shaped cavity or cavities 37 provided in the housing 27 at the end 31 near the permanent magnet 35.

The reeds 36 are tuned to different frequencies corresponding to certain predetermined speeds of the motor vehicle. When the permanent magnet 35 is rotated by the speedometer cable 32 the change in magnetic flux through the reeds 36 will vibrate the reeds, and if this change is of the same frequency as one of the frequencies to which the reeds are tuned the corresponding reed will vibrate with a greater amplitude. The free end of the reed will, therefore, knock against the wall of the beforementioned cavity 37 in the housing 27 and thus provide an audible signal indicating that the vehicle has attained a certain predetermined speed. The reeds 36 can be mounted in the recesses 39 of the housing 27 by U-shaped ends 40 so that their free length is adjustable by moving the reed slightly in a longitudinal direction. Thus the frequency of each reed can be changed to adjust the warning device to individual requirements. The adjustment can, for example, be performed by a key 41 (FIG. 14) fitting into a hole 42 above the reed and engaging with an eccentric pin 43 a slot 44 in the U-shaped end 40 of the reed 36.

The beforementioned speed warning device can be complemented by a recording device to produce a record of the speeds at which the vehicle has travelled during a certain time period. Such an arrangement is shown in FIGS. 12 and 13. In this case an endless tape 45 is guided past an additional set of reeds 46 tuned to frequencies within a predetermined speed range and having protrusions or pins 47 on their free ends to mark the passing tape 45. The tape 45 can be moved by rollers 48 arranged within the housing 49 and driven through suitable gears 50 by the sleeve 33 rotating with the inner speedometer cable 32 as mentioned before. Provisions can be made within the housing, for example, by pin 51 to erase the marking on the tape 45 when the latter has made one full run within the housing. If a permanent record is required a metal foil can be arranged underneath the tape. The vibrating reeds will then produce markings on the foil in accordance with their position within the housing thus giving indications of the reeds which were in resonance with the speeds of the rotating magnet, thus recording the speeds of the motor vehicle at various times.

It must be understood that the vibrating reeds can also be used to operate electric contacts which in turn can be used to open or close electric circuits for further indicating and controlling purposes as already mentioned above.

I claim:

1. A speed indicator comprising a housing, a rotatable drive cable passing through said housing, a hollow drive shaft rotatably mounted in said housing, said cable passing axially entirely through said shaft and being attachable thereto for rotation therewith, a plurality of tuned reeds, recess means being formed in a first end of said housing and extending arcuately about said drive shaft for receiving said plurality of reeds, a first end of each of said reeds being anchored to said housing within said recess means, said reeds extending parallel to the axis of said drive shaft, cavity means defined in the second end of said housing forming a resonance chamber for the second end of each of said reeds, said second ends of said reeds being free ends extending into said chamber, a permanent magnet mounted on said shaft for rotation past said reeds, and said reeds being so positioned with respect to the surface defining said chamber that, upon oscillation of a particular reed at its resonant frequency, the said reed contacts a portion of said surface to produce an audible signal.

2. A speed indicator according to claim 1, having additional reeds arranged in an arc about said drive shaft, a pair of rollers rotatably mounted in said housing extending parallel to said drive shaft, gear means connecting said drive shaft and said rollers, a tape loop passing over said rollers and past the free ends of said additional reeds, said additional reeds presenting pins at their free end, said pins and said tape loop being so arranged that said pins mark said tape loop on maximum reed oscillation, and erasing means to remove the markings on said tape each time the tape loop has completed a full cycle.

3. A speed indicator according to claim 2, wherein a foil is arranged adjacent said tape loop, said foil being marked simultaneously with said tape loop in response to maximum reed oscillation.

* * * * *